(12) United States Patent
Morikoshi et al.

(10) Patent No.: US 7,004,110 B2
(45) Date of Patent: Feb. 28, 2006

(54) FEEDING APPARATUS AND A METHOD OF FEEDING

(75) Inventors: Toshimichi Morikoshi, Kuroiso (JP); Tamotsu Suzuki, Kuroiso (JP); Hiroshi Horikawa, Kuroiso (JP)

(73) Assignee: Itochu Feed Mills Co., Ltd, Tokyo (JP)

( * ) Notice: Subject to any disclaimer, the term of this patent is extended or adjusted under 35 U.S.C. 154(b) by 0 days.

(21) Appl. No.: 10/363,325

(22) PCT Filed: Aug. 2, 2001

(86) PCT No.: PCT/IB01/01379

§ 371 (c)(1),
(2), (4) Date: Jun. 12, 2003

(87) PCT Pub. No.: WO02/15679

PCT Pub. Date: Feb. 28, 2002

(65) Prior Publication Data

US 2004/0035368 A1    Feb. 26, 2004

(30) Foreign Application Priority Data

Aug. 9, 2000  (JP)  ............................. 2000-241937

(51) Int. Cl.
*A01K 39/01* (2006.01)
(52) U.S. Cl. .............................. 119/61.57; 119/51.01; 119/51.03

(58) Field of Classification Search ............. 119/51.03, 119/57.8, 61.1, 61.57, 70, 51.01
See application file for complete search history.

(56) References Cited

U.S. PATENT DOCUMENTS

| | | | | |
|---|---|---|---|---|
| 1,123,501 A | * | 1/1915 | Dreibelbis | ................ 119/51.01 |
| 2,892,604 A | * | 6/1959 | Keen et al. | ............... 248/125.3 |
| 3,015,307 A | * | 1/1962 | Johnson et al. | ............. 119/61.1 |
| 3,200,790 A | * | 8/1965 | Anderson | ................. 119/51.03 |
| 5,217,740 A | * | 6/1993 | Lanter | ......................... 426/573 |
| 5,386,978 A | * | 2/1995 | Ladwig | ................... 269/289 R |
| 6,340,039 B1 | * | 1/2002 | Chang | ...................... 144/253.2 |

FOREIGN PATENT DOCUMENTS

| | | |
|---|---|---|
| JP | 5-328871 | 12/1993 |
| JP | 8-9300 | 1/1996 |
| JP | 11-302185 | 11/1999 |

* cited by examiner

*Primary Examiner*—Robert P. Swiatek
(74) *Attorney, Agent, or Firm*—Haynes and Boone, LLP

(57) ABSTRACT

A feeding apparatus aimed at efficiently supplying feed to chicks in a chick box, which can hold the feed in the chick box and can supply the feed to the chicks in the chick box, wherein the feed is supplied to the chicks in the chick box by means of a feeding apparatus which can maintain the feed at the height of the chicks' beaks when they are standing.

7 Claims, 7 Drawing Sheets

[[# FEEDING APPARATUS AND A METHOD OF FEEDING

This application is a national phase of International Application No. PCT/IB01/01379 filed Aug. 2, 2001, which claims priority to Japanese Patent Application No. 2000-241937 filed Aug. 9, 2000.

TECHNICAL FIELD

The present invention relates to a feeding apparatus for feeding chicks in a chick box, and to a method of feeding.

BACKGROUND ART

Infection of chicken eggs by *Salmonella* (such as *Salmonella Enteritidis* (SE)) is one of the principal causes of *Salmonella* food poisoning.

When a laying hen is infected with *Salmonella*, the infection spreads in the body to the ovaries and oviducts, and penetrates the eggs. Consequently, the interior of an egg is already contaminated with *Salmonella* when it is laid. *Salmonella* contamination cannot be detected by external inspection, and internal contamination cannot be removed by the washing process at grading and packaging centers (the plants where chicken eggs are cleaned, graded by size and packaged).

Even when chickens are infected with *Salmonella*, the rate of *Salmonella* contamination in the eggs produced is only about 0.01–1%, but if such eggs are not exposed to sufficient heat during preparation the bacteria may survive and proliferate to the point of causing food poisoning. Lower bacterial numbers are required to cause food poisoning in people with low resistance such as infants and the sick and elderly than in healthy adults.

Measures are necessary at all stages in the production and distribution processes from farm to table in order to ensure the hygienic quality of the eggs and prevent *Salmonella* food poisoning. In particular, it is necessary to reduce *Salmonella* infection rates in chicken flocks.

Under current poultry practices, however, chicks are produced in hatcheries without any contact with their parents, and are thoroughly disinfected at each stage in order to prevent the transmission of disease from breeding stock. As a result, the chicks do not receive from their parents the beneficial intestinal flora that they need to protect them against intestinal pathogens, and are extremely vulnerable to *Salmonella* at juveniles. When such chicks are then raised in the normal way in the field, it requires six weeks or more for them to develop the intestinal flora that they need to protect them against *Salmonella* infection.

Consequently, it is thought that *Salmonella* infection rates in flocks are affected by *Salmonella* infection of juvenile chicks with immature intestinal flora, and therefore a reduction in *Salmonella* infection rates among chicks is necessary in order to reduce *Salmonella* infection rates in flocks.

A method has already been developed of effectively preventing *Salmonella* infection by the controlled administration of adult intestinal flora to chicks (E. Nurmi and M. Rantala, New aspects of *Salmonella* infection in broiler industry, *Nature* 241:210–211 (1973). Using this method, proliferation of *Salmonella* in the bodies of chicks is effectively prevented even if they are orally infected, and the high level of excretion normally seen in the field does not occur. This method is known as the Competitive Exclusion or Nurmi method.

In general, the anaerobically cultured cecal contents, mucous membrane of the gut or feces of adult birds are used to inoculate the chicks with intestinal flora. This is known as an Undefined Culture because the species and numbers of bacteria cannot be precisely identified. Products are also available in which the bacterial species and numbers in an Undefined Culture have been identified through long-term continuous culture, or in which pure bacterial cultures isolated from Undefined Cultures have been mixed together. These are known as Defined Cultures because the bacterial species and numbers have been identified. Undefined Cultures and Defined Cultures are known collectively as Competitive Exclusion Cultures (CE Cultures).

In order for such Competitive Exclusion Cultures to be used to prevent *Salmonella* contamination, they must be administered to the chicks in the necessary quantity as soon as possible after hatching.

Oral administration to individual chicks as in a laboratory is ideal for this purpose, but this method is too labor- and time-intensive and consequently too expensive for application in the field. Under field conditions, spraying of hatching eggs and misting of chicks are used in the hatcheries and administration through drinking water on the farm.

Unfortunately, it is difficult to administer a sufficient quantity of Competitive Exclusion Culture to chicks soon enough after hatching by these methods. In particular, it is difficult to administer the necessary quantity of Competitive Exclusion Culture in a short period of time to 0–7 day old chicks, which consume little food and water.

Under these circumstances, the inventors previously developed a probiotic composition (a live microbial feed supplement) suitable for administering the necessary quantity of Competitive Exclusion Culture to chicks as soon as possible after hatching, in which the Competitive Exclusion Culture is fixed in a gel with polysaccharides which gelate in a water medium (Japanese Patent Application Laid-open No. H11-302185). Using this probiotic composition, the chicks' natural genetic program (habit) of pecking and ingesting solid matter in front of them is exploited to induce them to ingest the necessary quantity of Competitive Exclusion Culture in a short period of time during the first 7 days of life when they consume little food or water, and thus to protect them against *Salmonella* contamination.

However, a feeding apparatus and feeding method have yet to be developed capable of inducing chicks in a chick box to efficiently ingest a probiotic composition in solid gel form.

DISCLOSURE OF THE INVENTION

An object of the present invention is to provide a feeding apparatus and feeding method capable of inducing chicks to efficiently ingest feed in a chick box.

(1) In order to achieve this object, the present invention provides a feeding apparatus which can hold feed in a chick box and supply the feed to chicks in the chick box, wherein the feed can be maintained at the height of the chicks' beaks when they are standing.

Newly hatched chicks are not steady on their feet and spend most of their time sitting, making it easier for them to recognize and ingest feed placed on the bottom of the chick box, but as time elapses after hatching they are more steady on their feet and spend more time standing, making it easier for them to recognize and ingest feed which is positioned at beak height. Consequently, in the feeding apparatus of the present invention, the position of the feed in the chick box is maintained at the height of the chicks' beaks when they are standing in the chick box, allowing for more efficient ingestion of feed than if the feed were placed on the bottom of the chick box.

Moreover, if feed is placed on the bottom of the chick box, the chicks are likely to step on the feed and scatter it, making it difficult to ensure that the chicks actually ingest the feed packed in the feeding apparatus. By contrast, in the feeding apparatus of the present invention, stepping on and scattering of the feed by the chicks is prevented by maintaining the position of the feed in the chick box at the height of the chicks' beaks when standing, ensuring that the feed packed in the feeding apparatus is actually ingested by the chicks.

There are no particular limits on the types of feed used with the feeding apparatus of the present invention, as long as they are fed to the chicks to achieve the specified objectives, and specific examples include foods, probiotics, vaccines, various drugs and mixtures of these. Food may contain ingredients necessary for chick growth such as water, glucose and other carbohydrates, protein, fat, vitamins and minerals, while probiotics, vaccines and drugs may contain ingredients (such as Competitive Exclusion Cultures for forming intestinal flora in chicks in the case of probiotics) necessary for maintaining chick health (by increasing resistance to pathogenic bacteria or preventing or treating various diseases, for example).

There are no particular limits on the form of feed used with the feeding apparatus of the present invention, so long as it can be stored within the chick box by the feeding apparatus of the present invention, and powdered, granular, liquid and gel forms are all acceptable, but the gel form is preferred. This is because the gel form allows the chicks' genetic program (habit) of pecking and ingesting solid matter in front of them to be exploited to induce them to ingest the necessary quantity of feed in a short period of time during the first 7 days of life when their food and water intake is low.

Chicks suited to the feeding apparatus of the present invention may be the chicks of any bird species, but are ordinarily those of domestic poultry such as chickens. There are no particular limits on the chicks' stage of growth (elapsed time after hatching), but the feeding apparatus of the present invention is ideally suited to feeding chicks aged about 0–7 days, a period during which food and water intake is low. The feeding apparatus of the present invention is also best suited to chicks which have been hatched long enough that they spend most of their time standing rather than to newly-hatched chicks which are unsteady on their feet and spend most of their time sitting down.

The height at which food is maintained in the feeding apparatus of the present invention is the height of the chicks' beaks when they are standing in the chick box. The height differs according to the species and age of the chicks, but for example if the chick box contains 0–2 day old chicken chicks, the height is normally 50–100 mm or preferably 70–90 mm or more preferably 75–85 mm above the surface of the base of the chick box.

The position at which feed is maintained in the feeding apparatus of the present invention is not restricted as long as it is at the height of the chicks' beaks when standing in the chick box, and may be near the center of the chick box or next to the side panel or partition, for example, but a position next to the side panel or partition of the chick box is desirable from the standpoint of preventing obstacle to the chicks in the box.

There are no particular limits on the shape, structure, size and the like of the chick box used with the feeding apparatus of the present invention as long as it is capable of containing chicks. The chick box generally has a box shape with a base and vertical sides surrounding the base. In some cases the chick box may have partitions dividing the interior of the box into several compartments, or it may have a lid. The top end portion of the side panel or partition panel of the chick box may also be provided with protrusions that fit into holes or indentations in the lid. Examples of chick boxes include rearing boxes used for rearing chicks in a hatchery or farm and transport or shipping boxes used for transporting or shipping chicks from hatchery to farm, and the feeding apparatus of the present invention can be applied to any of these kinds of boxes.

There are no particular limits on the shape, structure, size and the like of the feeding apparatus of the present invention, so long as it can maintain the position of the feed in the chick box at the height of the chicks' beaks when they are standing, and supply feed to the chicks in the chick box.

(2) In a preferred embodiment of the feeding apparatus of the present invention, the feeding apparatus comprises a feed container which has an aperture and can contain gel feed, wherein the feed container can be maintained at the height of the chicks' beaks when they are standing.

In the present embodiment, the feed container can easily be filled with gel feed through the aperture in the container. Also, because the feed container is maintained at the height of the chicks' beaks when they are standing, the gel feed contained in the feed container is efficiently supplied to the chicks through the aperture in the feed container.

In the present embodiment, there are no particular limits on the shape, structure, size and the like of the feed container, so long as it has an aperture and can contain gel feed. There are also no particular limits on the shape, size and the like of the aperture of the feed container, so long as the feed container can be filled with gel feed through the aperture, and so long as the feed in the feed container can be supplied to the chicks through the aperture.

In the present embodiment, the feed container should ideally be filled with gel feed, but may also be filled with powdered, granular, liquid and other feeds as long as they can be contained in the feed container.

(3) In a preferred embodiment of the feeding apparatus of the present invention, the feed container has a protrusion and/or indentation which can prevent spillage of the gel feed contained in the feed container.

Spillage of the gel feed contained in the feed container may occur when the gel feed in the feed container is subjected to shock or vibration, as for example when chicks are pecking at and trying to eat the gel feed in the feed container, or when a chick box equipped with the feeding apparatus is shipped or transported. In the present embodiment, the feed container is provided with a protrusion and/or indentation which increases the area of contact between the feed container and the gel feed inside the feed container, thus preventing spillage of the gel feed contained in the feed container and ensuring that the gel feed in the feed container is ingested by the chicks.

In the present embodiment, there are no particular limits on the shape, structure, size or the like of the protrusion and/or indentation in the feed container, so long as it increases the area of contact between the feed container and the gel feed contained in the feed container.

(4) In a preferred embodiment of the feeding apparatus of the present invention, the feeding apparatus comprises an aperture direction adjuster which can adjust the aperture direction of the aperture of the feed container.

In the present embodiment, the aperture direction of the aperture of the feed container can be adjusted to make it easier for the chicks to recognize and ingest the feed in the feed container, thus allowing them to ingest the feed in the feed container more efficiently.

In the present embodiment, there are no particular limits on the shape, structure, size and the like of the aperture direction adjuster, as long as it can adjust the aperture direction of the aperture of the feed container.

(5) In a preferred embodiment of the feeding apparatus of the present invention, the feeding apparatus comprises a hanger which can hang on the top end portion of a side panel or partition panel of the chick box, and a suspender which can suspend the feed container from the top end portion of a side panel or partition panel of the chick box.

In the present embodiment, the feeding apparatus can easily be installed in the chick box by hanging the hanger on the top end portion of a side panel or partition panel of the chick box. The feed container can also be maintained at the height of the chicks' beaks when they are standing by suspending the feed container from the top end portion of a side panel or partition panel of the chick box by means of the suspender. Moreover, installing the feeding apparatus of the present embodiment near the side panel or partition panel of the chick box prevents damage to the chicks in the chick box from the feeding apparatus.

In the present embodiment, there are no particular limits on the shape, structure and the like of the hanger, so long as it can be hung on the top end portion of a side panel or partition panel of the chick box. There are no particular limits on how the hanger is hung, and for example it may have a flat part and be hung on the top end portion of a side panel or partition panel of the chick box by laying the flat part on the top end portion, or it may have a hook and be hung on the top end portion of a side panel or partition panel of the chick box by hanging the hook on the top end portion. In the present embodiment, there are also no particular limits on the shape, structure and the like of the suspender, so long as it is capable of suspending the feed container from the top end portion of a side panel or partition panel of the chick box. The suspenders may suspend the feed containers from both sides of a side panel or partition panel of the chick box (so that the feed containers are on opposite sides with the side panel or partition panel between them), a feed container may be suspended from only one side.

(6) In a preferred embodiment of the feeding apparatus of the present invention, the hanger has an insertion hole into which can be inserted a protrusion provided at the top end portion of the side panel or partition panel of the chick box.

In the present embodiment, the hanger is securely fixed to the top end portion of the side panel or partition panel of the chick box by inserting the protrusion provided at the top end portion of the side panel or partition panel of the chick box into the insertion hole of the hanger.

In the present embodiment, there are no particular limits on the shape, size, position and the like of the insertion hole, so long as a protrusion provided at the top end portion of a side panel or partition panel of the chick box can be inserted therein.

(7) In a preferred embodiment of the present invention, a plurality of the feed containers are provided so that the hanger is positioned between them.

In the present embodiment, the feed containers are suspended from the top end portion of a side panel or partition panel of the chick box on both sides of the side panel or partition panel (that is, the suspended containers are on opposite sides with the side panel or partition panel between them), allowing for feed to be supplied more cost-effectively to chicks on both sides of the side panel or partition panel of the chick box.

(8) In a preferred embodiment of the present invention, the feeding apparatus is made of A-PET.

In the present embodiment, because A-PET is transparent and can be incinerated, it is easy to assess consumption of feed in the feed container, and the feeding apparatus can be incinerated while still installed in the chick box.

(9) Moreover, in order to achieve the said object, the present invention provides a feeding method for placing feed in a chick box and supplying the feed to chicks in the chick box, wherein the feed is placed at the height of the chicks' beaks when they are standing.

In the feeding method of the present invention, as in the feeding apparatus of the present invention, the chicks ingest feed more efficiently than if it were placed on the bottom of the chick box because it is placed at the height of the chicks' beaks when they are standing in the chick box, which also prevents the chicks from stepping on the feed and scattering it, ensuring that the feed in the chick box is ingested.

In the feeding method of the present invention, the suitable chicks, feed, height of the feed in the chick box, position of feed in the chick box and the like are the same as in the feeding apparatus of the present invention, and the feeding method of the present invention may be implemented by using the feeding apparatus of the present invention. However, the feeding method of the present invention may be implemented using a feeding apparatus other than the feeding apparatus of the present invention.

(10) In a preferred embodiment of the feeding method of the present invention, the feed is a gel feed.

In the present embodiment, the use of a gel feed allows the chicks' genetic program (habit) of pecking and trying to eat solid matter in front of them to be exploited to induce them to eat the necessary amount of feed in a short period of time during the first 7 days of life when they consume little food or water.

When the feed is in gel form, the gel strength should be about 200–2000 g/cm$^2$, and when agar is used as the gelatinizer this gel strength can be obtained with an agar concentration of about 0.5–3.0%, depending on the type of agar.

(11) In a preferred embodiment of the feeding method of the present invention, the feed is colored blue.

Chicks will eat food that is colored blue by preference over feed that is uncolored or colored red, green or the like, so in the feeding method of the present embodiment the feed is colored blue in order to induce the chicks to eat the feed efficiently.

In the present embodiment, the feed contains blue pigment. There are no particular limits on the type of blue pigment contained in the feed as long as it colors the feed blue. Specific examples of blue pigments include Blue No. 4, Blue No. 1 and Blue No. 2, and these can be used individually or in combinations of 2 or more. "Blue" signifies a color with a spectrum wavelength of 400–500 nm or preferably 450–500 nm. For example, if Blue No. 4 is used as the blue pigment, a color corresponding to 0.03–0.1% (w/v) of Blue No. 4 solution is desirable, and a color corresponding to 0.03–0.04% (w/v) of Blue No. 4 solution is more desirable.

In the present embodiment, so long as the feed is colored blue there are no particular limits on the blue pigment content of the feed, which can be adjusted as necessary according to the type of blue pigment and the properties of the feed, but the blue pigment content should be enough to color all of the feed blue. When the feed is a gel and Blue No. 4 is used as the blue pigment, it is desirable to adjust the Blue No. 4 content so that the Blue No. 4 concentration in the feed is 0.01–0.5% (w/v), or preferably 0.03–0.1% (w/v), or more preferably 0.03–0.04% (w/v).

BEST MODE FOR CARRYING OUT THE INVENTION

An embodiment of the present invention is explained below based on the drawings.

Figure 1:
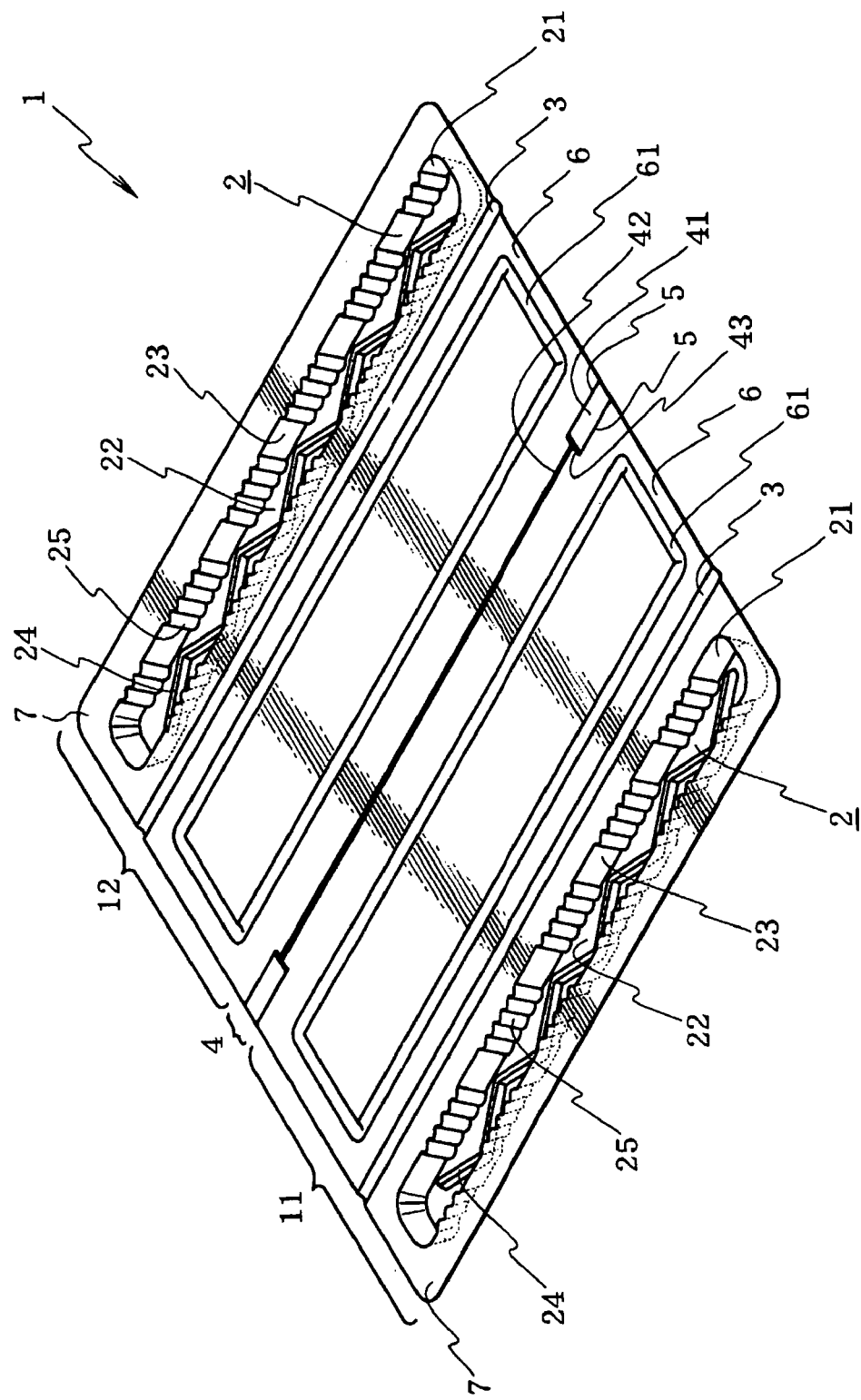
FIG. 1 is an oblique view showing one embodiment of the feeding apparatus of the present invention.
Figure 2:
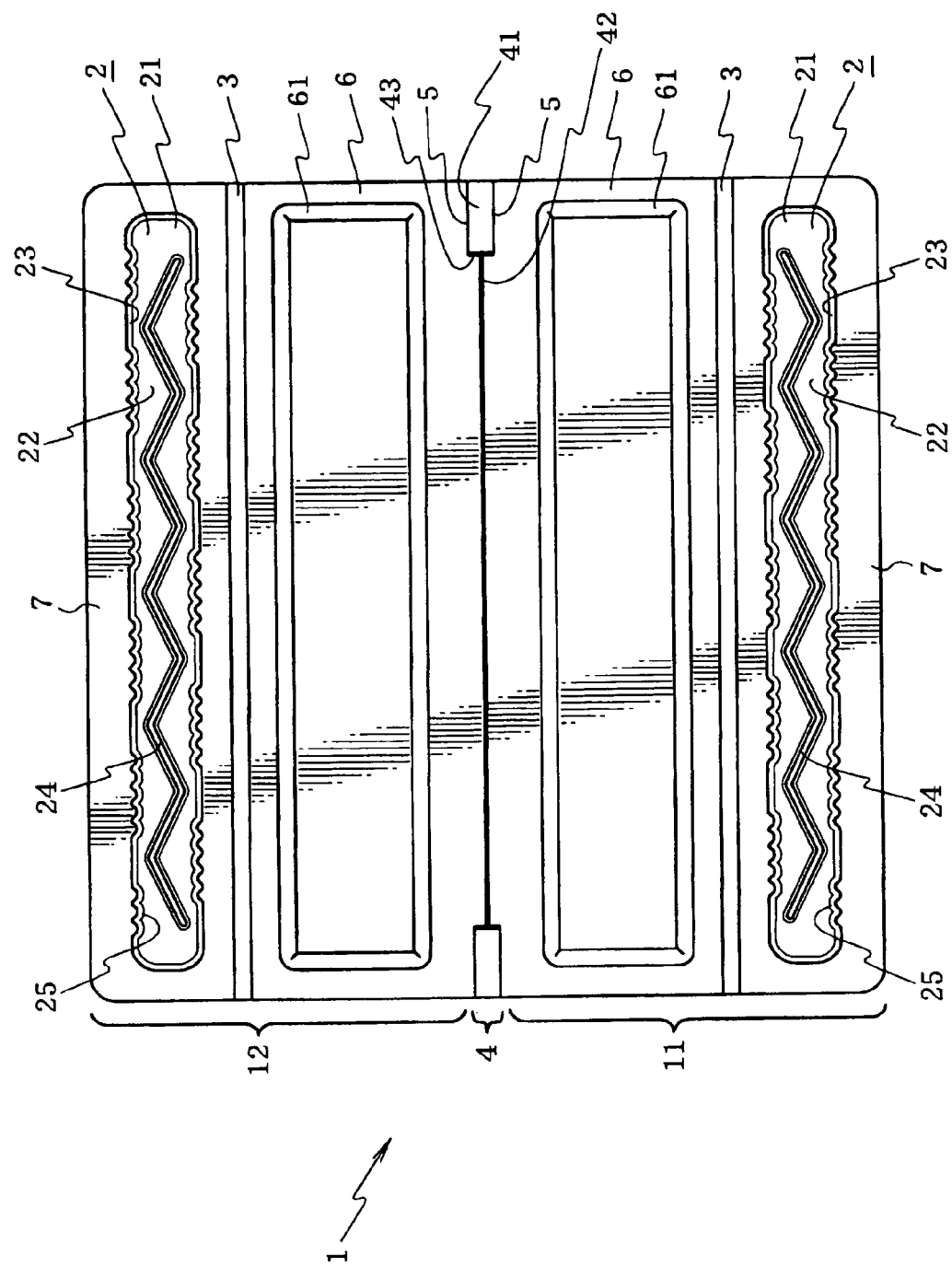
FIG. 2 is a plane view showing one embodiment of the feeding apparatus of the present invention.
Figure 3:
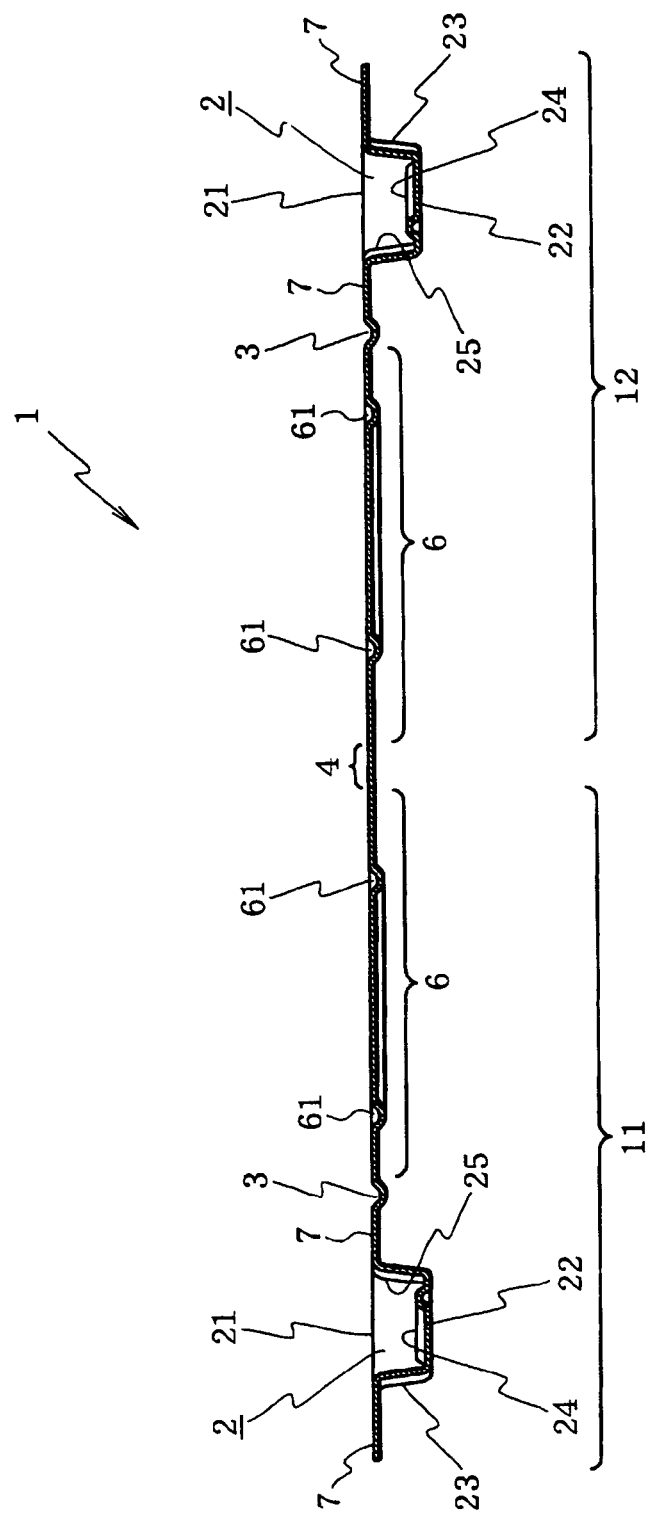
FIG. 3 is a cross-section showing one embodiment of the feeding apparatus of the present invention.
Figure 4:
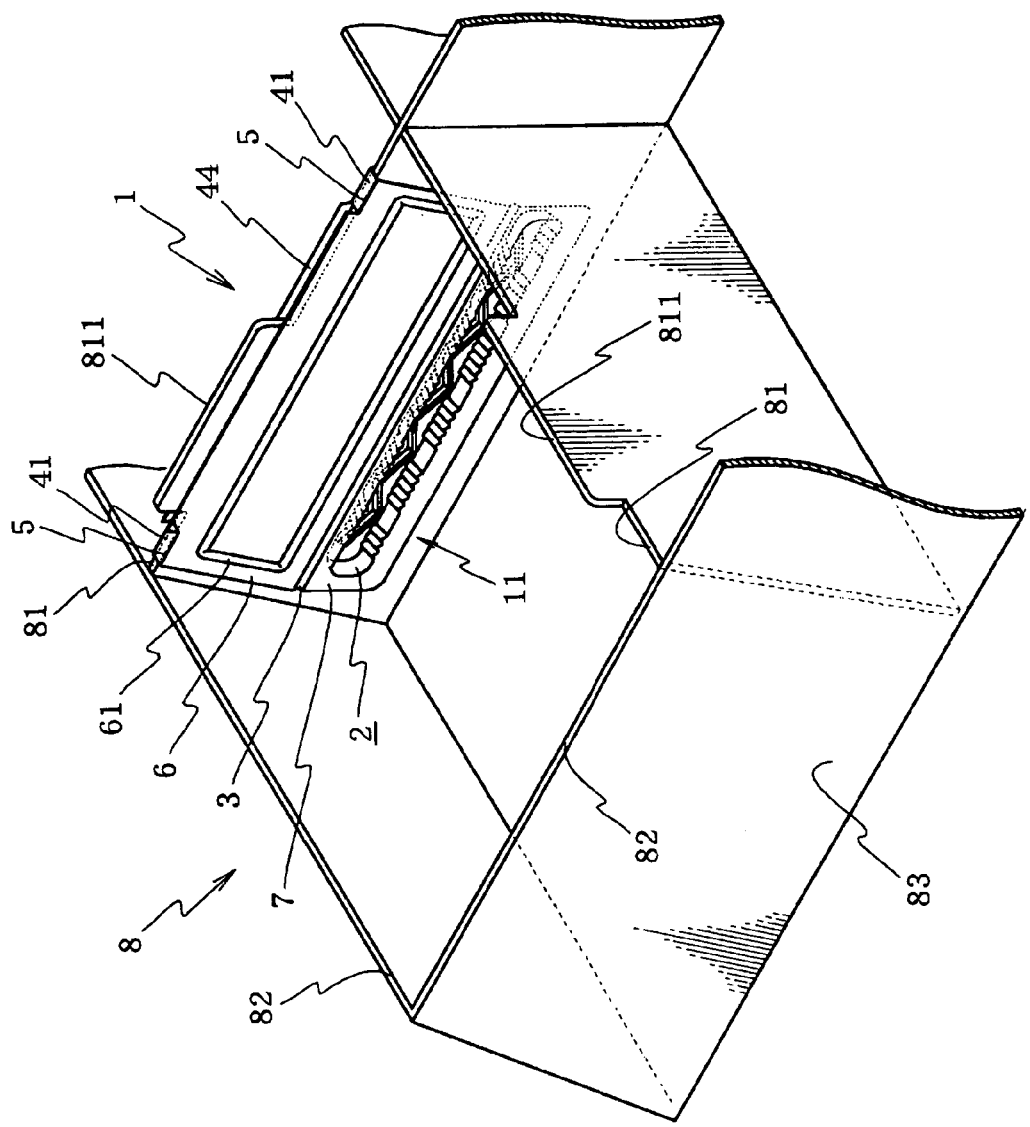
FIG. 4 is an oblique view showing one embodiment of the feeding apparatus of the present invention installed on a partition panel of a chick box.
Figure 5:
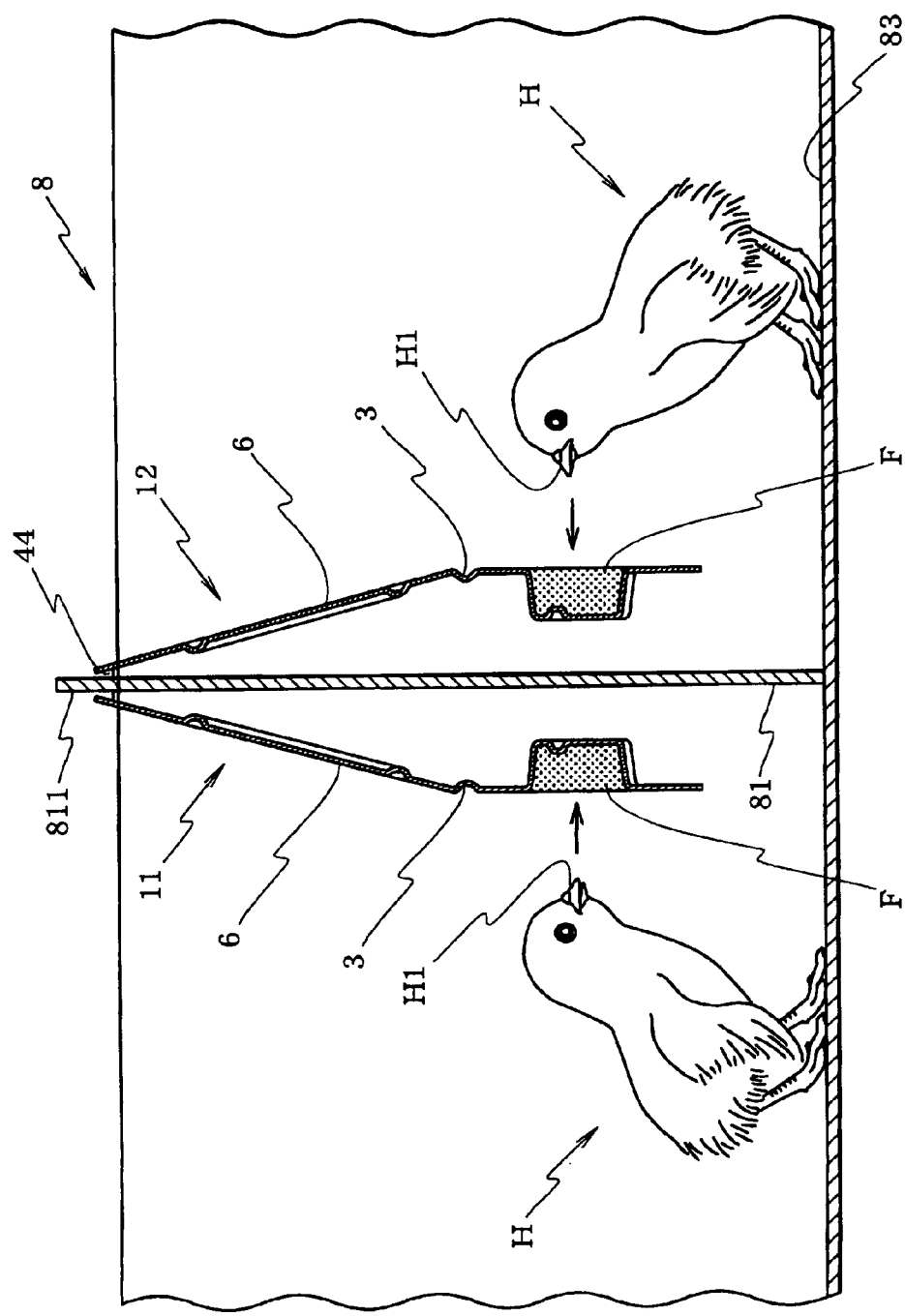
FIG. 5 is a cross-section showing one embodiment of the feeding apparatus of the present invention installed on a partition panel of a chick box and supplying feed to chicks in the chick box.

FIG. 1 is an oblique view showing one embodiment of the feeding apparatus of the present invention, FIG. 2 is a plane view showing the same embodiment, FIG. 3 is a cross-section showing the same embodiment, FIG. 4 is an oblique view showing the feeding apparatus of the same embodiment installed on a partition panel of a chick box, and FIG. 5 is a cross-section showing the feeding apparatus of the same embodiment installed on a partition panel of a chick box and supplying feed to chicks in the chick box.

As shown in FIGS. 1–3, feeding apparatus 1 comprises first body 11, second body 12, and hanger 4 between first body 11 and second body 12.

As shown in FIGS. 1–3, first body 11 and second body 12 each comprise feed container 2 having aperture 21, flange 7 around aperture 21, aperture direction adjuster 3 for adjusting the aperture direction of aperture 21, and suspender 6 which is connected to flange 7 by means of aperture direction adjuster 3, and first body 11 and second body 12 are positioned symmetrically on either side of hanger 4.

As shown in FIGS. 1–3, feed container 2 comprises semi-rectangular base 22 and side panel 23 surrounding base 22, with flange 7 around the top end portion of side panel 23.

As shown in FIGS. 1–3, aperture 21 is formed in a semi-rectangular shape at the top end of feed container 2, so that feed container 2 (the hollow area formed by base 22 and side panel 23 ) can be filled with gel feed through aperture 21. Also, as shown in FIG. 5, the gel feed F contained in feed container 2 can be ingested by chick H in chick box 8 through aperture 21. Also, as shown in FIGS. 3 and 5, the area of aperture 21 is slightly wider than the area of base 22, making it easier to pack in gel feed through aperture 21 and to supply feed to chicks.

Feed container 2 may contain powder, granular or other feed other than gel feed, but as shown in FIG. 5, when feed containers 2 are suspended from the top end portion of partition panel 81 of chick box 8 and the feed F in feed containers 2 is supplied to chicks H, the aperture direction of apertures 21 of feed containers 2 is perpendicular or roughly perpendicular to partition panel 81 of chick box 8, so that filling feed containers 2 with gel feed makes more sense from the standpoint of preventing spillage of feed from feed containers 2. Moreover, having feed containers 2 filled with a gel feed allows the chicks' genetic program (habit) of pecking and trying to eat solid matter in front of them to be exploited to induce them to eat the necessary quantity of feed in a short period of time during the first 7 days of life when they consume little food or water.

As shown in FIGS. 1–3, first body 11 and second body 12 each have one feed container 2. It is also possible for first body 11 and second body 12 to each have multiple feed containers 2, but as shown in FIGS. 4 and 5, when feed containers 2 are suspended from the top end portion of partition panel 81 of chick box 8, it is better from the standpoint of feeding as many chicks as possible for first body 11 and first body 12 to each have one feed container 2, and for apertures 21 of feed containers 2 to be as horizontally long as possible. The horizontal length of apertures 21 of feed containers 2 can be determined as needed according to the horizontal length of the partition panel or side panel of the chick box on which feed container 2 is suspended.

As shown in FIGS. 1–3, feed containers 2 are parallel to hanger 4, and as shown in FIGS. 4 and 5, when feed containers 2 are suspended from partition panel 81 of chick box 8, feed containers 2 are maintained at a fixed height above the surface of bottom 83 of chick box 8. As shown in FIG. 5 "a fixed height" signifies the height of beaks H1 of chicks H when they are standing in chick box 8. The height differs according to the species and age of the chicks, but for example if chicks H are 0–2 day old chicks, this height would normally be 50–100 mm or preferably 70–90 mm or more preferably 75–85 mm above Bottom 83 of chick box 8.

The structure of feed container 2 may be varied as long as it has aperture 21 and can contain a gel feed, and it is possible for example to form aperture 21 and base 22 in a circular or other shape, or for base 22 to be curved, or for the areas of aperture 21 and base 22 to be identical or nearly identical. There are no particular limits on the capacity of feed container 2, but the capacity should be enough to contain the quantity of feed necessary to supply all chicks in the chick box. For example, when providing chicks with a gel probiotic composition containing a competitive exclusion culture for purposes of forming their intestinal flora, the capacity of feed container 2 should be determined so that each chick can ingest about 0.5 ml of the probiotic composition; if one feed container 2 is being used to supply 25 chicks with gel probiotic composition, then the capacity of one feed container 2 should be at least 25 ml. In addition, the depth of feed container 2 should be such that the chicks can ingest the gel feed contained in feed container 2 with their beaks, or about 3–15 mm or preferably 5–10 mm, depending on the type and stage of development of the chicks.

As shown in FIGS. 1–3, the surface of base 22 of feed container 2 has protrusions 24 (referred to hereunder as "zigzag protrusions 24") which appear as a zigzag in the plane view (see FIG. 2), while the inside wall of side panel 23 of feed container 2 has protrusions 25 (referred to hereunder as "wavy protrusions 25") which appear wavy in the plane view (see FIG. 2). Zigzag protrusions 24 and wavy protrusions 25 increase the area of contact between feed container 2 and the gel feed contained in feed container 2, and serve to prevent spillage of the gel feed contained in feed container 2. The shape, position and size of zigzag protrusions 24 and wavy protrusions 25 may be varied as long as the area of contact between feed container 2 and the gel feed contained in feed container 2 is increased. Zigzag protrusions 24 and wavy protrusions 25 may be eliminated or only one may be provided, but from the standpoint of effectively preventing spillage of the gel feed it is better to have both.

It is also possible to have indentations in the upper surface of bottom 22 and the inner wall of side panel 23 of feed container 2. Like the protrusions, the indentations are designed to prevent spillage of the gel feed contained in feed container 2 by increasing the area of contact between feed container 2 and the gel feed contained in feed container 2. The shape, position, size and the like of the indentations may be determined as appropriate so long as the area of contact between feed container 2 and the gel feed contained in feed container 2 is increased.

As shown in FIGS. 1–3, aperture 21 of feed container 2 is surrounded by flat flange 7, the corners of which are rounded. The corners of flange 7 are rounded in order to prevent the chicks from being injured by the corners of flange 7. The shape, size and the like of flange 7 may be varied as desired with no particular limitations. Flange 7 may also be eliminated if allowed in molding process for feeding apparatus 1.

As shown in FIGS. 1–3, aperture direction adjuster 3 is formed as a groove between flange 7 and suspender 6. The angle between suspender 6 and flange 7 can be adjusted around the axis of this groove to adjust the aperture direction of aperture 21 of feed container 2. The structure of aperture direction adjuster 3 may be varied as long as it can adjust the aperture direction of aperture 21 of feed container 2. When it is possible for the chicks to ingest the gel feed contained in feed container 2 without any adjustment of the aperture direction of aperture 21, aperture direction adjuster 3 may be omitted.

As shown in FIGS. 1–3, suspender 6 consists of a semi-rectangular sheet which is connected at one end (the bottom in FIG. 2) to flange 7 by means of aperture direction adjuster 3, and at the other end (the top in FIG. 2) to the two connectors 41 at both ends of hanger 4 by means of bends 5. Suspender 6 serves to maintained a fixed distance between aperture direction adjuster 3 and hanger 4, thus maintaining a fixed distance between hanger 4 and feed container 2, which is connected to aperture direction adjuster 3 by means of flange 7. That is, as shown in FIGS. 4 and 5, when feed container 2 is suspended from the top end portion of partition panel 81 of chick box 8, suspender 6 serves to maintain feed container 2 at a fixed height above the surface of bottom 83 of chick box 8. As shown in FIG. 5, "a fixed height" signifies the height of the beaks H1 of chicks H when they are standing in chick box 8. The shape, structure and the like of Suspender 6 may be varied as long as it can maintain a fixed distance between feed container 2 and hanger 4, and for example it is possible for suspender 6 to be directly connected to feed container 2 (that is, connected to feed container 2 without aperture direction adjuster 3 and flange 7).

As shown in FIGS. 1–3, suspender 6 is provided with grooves 61, which appear semi-rectangular in the plane view (see FIG. 2) and serve to increase the strength of suspender 6. The shape, position, size and the like of grooves 61 may be varied as long as they increase the strength of suspender 6, and they may also be omitted.

As shown in FIGS. 1–3, bends 5 are set between hanger 4 and first body 11 and between hanger 4 and first body 12, and by bending feeding apparatus 1 by means of bends 5 it is possible to vary the angles between hanger 4 and first body 11 and between hanger 4 and first body 12 around the axes of bends 5. The structure of bends 5 may be varied as long as they can change the angles between hanger 4 and first body 11 and between hanger 4 and first body 12, and for example they may be grooved or notched.

As shown in FIGS. 1–3, hanger 4 is provided between first body 11 and second body 12, and includes connectors 41 at both ends of hanger 4, vertical notches 43, which appear vertically in FIG. 2 as though joining the opposing ends of bends 5 on both sides of connector 41, and horizontal notch 42, which appears horizontally in FIG. 2 as though joining the opposing vertical notches 43. Vertical notches 43 and horizontal notch 42 are shown in bold lines in FIGS. 1 and 2.

As shown in FIGS. 1–3, connectors 41 consist of rectangular sheets which are connected at one end (the bottom in FIG. 2) to first body 11 by means of bends 5, and at the other end (the top in FIG. 2) to second body 12 by means of bends 5. Connectors 41 serve to connect first body 11 to second body 12. As shown in FIGS. 4 and 5, when feed containers 2 are suspended from the top end portion of partition panel 81 of chick box 8, connectors 41 lie on the top end portion of partition panel 81 of chick box 8. The shape, structure and the like of connectors 41 may be varied so long as they connects first body 11 to second body 12.

Figure 7:
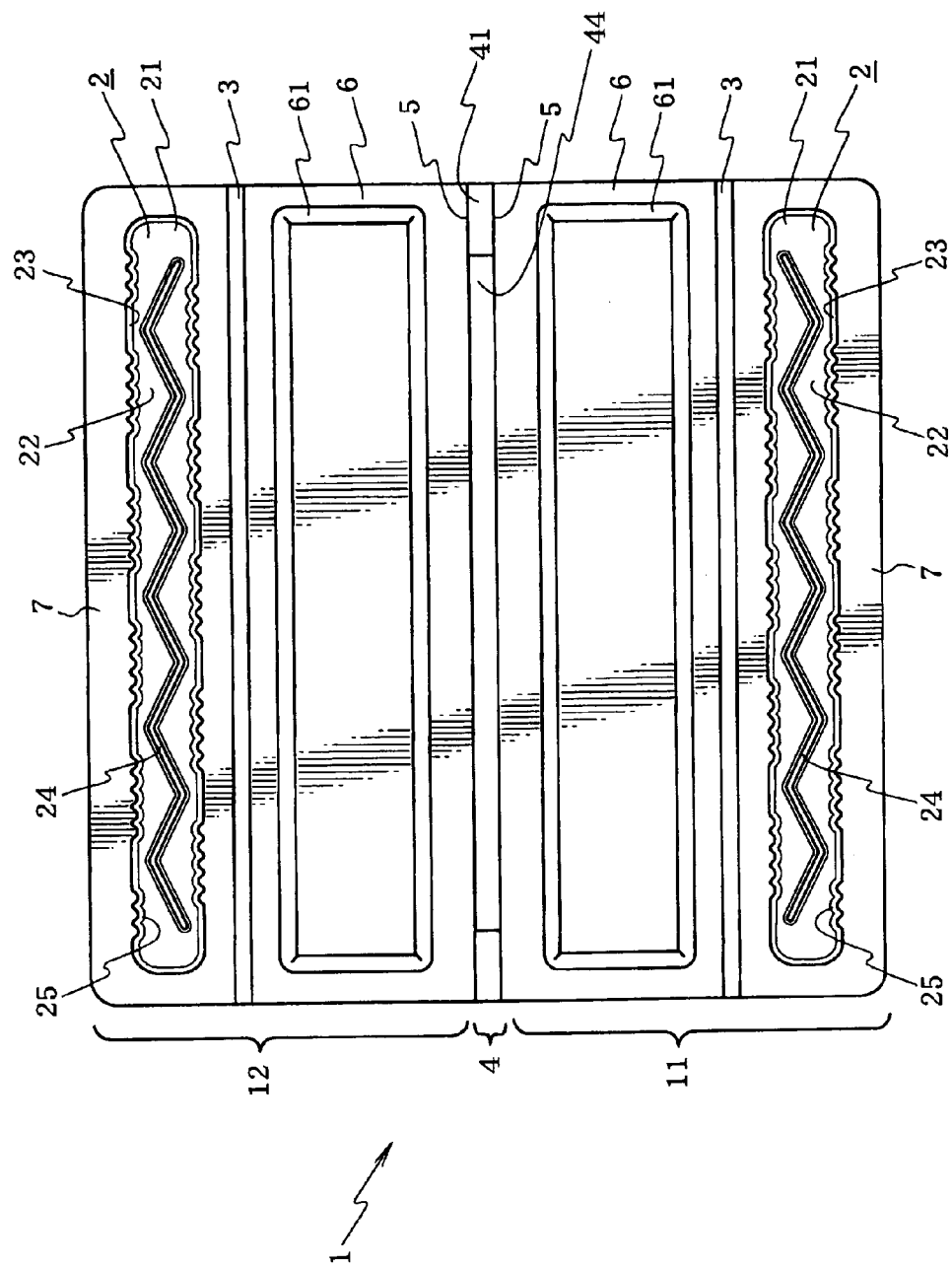
FIG. 7 is a plane view showing yet another embodiment of the feeding apparatus of the present invention.

As shown in FIGS. 1 and 2, when feeding apparatus 1 is not bent using bends 5, hanger 4 lacks an insertion hole, but as shown in FIGS. 4 and 5, when feeding apparatus 1 is bent using bends 5, insertion hole 44 is formed between the connectors 41 at both ends of hanger 4. Vertical notches 43 and horizontal notch 42 serve to form insertion hole 44 between connectors 41 at both ends of hanger 4 when feeding apparatus 1 is bent using bends 5. The position and the like of vertical notches 43 and horizontal notch 42 may be varied so long as they can form insertion hole 44 when feeding apparatus 1 is bent by means of bends 5. Also, as shown in FIG. 7, it is possible to make it so that insertion hole 44 can be formed even when feeding apparatus 1 is not bent by means of bends 5. In the feeding apparatus of the present invention, to say that "the hanger has an insertion hole" may signify either that insertion hole 44 is formed only when feeding apparatus 1 is bent by means of bends 5, as shown in FIGS. 4 and 5, or that insertion hole 44 is formed even when feeding apparatus 1 is not bent by means of bends 5, as shown in FIG. 7.

As shown in FIGS. 4 and 5, insertion hole 44 is designed to allow the insertion of protrusion 811, which is provided at the top end portion of partition panel 81 of chick box 8.

As shown in FIGS. 4 and 5, hanger 4 is hung on the top end portion of partition panel 81 of chick box 8 by inserting protrusion 811 at the top end portion of partition panel 81 into insertion hole 44, and laying connectors 41 on the top end portion of partition panel 81.

The material of feeding apparatus 1 is normally synthetic resin. Specific examples include polyethylene, polypropylene, ethylene-propylene copolymer, ethylene-vinyl acetate copolymer, ethylene-vinyl chloride copolymer, vinyl chloride-based resins, vinylidene chloride-based resins, styrene-based resins, acrylic-based resins, methacrylate-based resins, vinyl proprionate-based resins, vinyl acetate-maleic acid-based resins, vinyl chloride-vinyl acetate-based resins, polyvinyl ether-based resins and other thermoplastic resins; and polyamide (PA), polyacetal (POM), polycarbonate (PC), polyethylene terephthalate (PET), polybutylene terephthalate (PBT), polysulfone (PSF), polyethersulfone (PES), polyphenylene oxide (PPO), polyphenylene sulfide (PPS), polyallylate (PAR), polyether etherketone (PEEK), polyamideimide (PAI), polyimide (PI), polyetherimide (PEI) and other engineering plastics and the like, which may also be in an amorphous state.

An example of a preferred material for feeding apparatus 1 is amorphous PET (A-PET). Because A-PET is highly transparent and also combustible, it allows for easy assessment of the consumption of the gel feed 2 contained in feed container 2, and for feeding apparatus to be incinerated after use while still installed in chick box 8.

When synthetic resin is used as the material for feeding apparatus 1, feeding apparatus 1 can be molded as a whole according to ordinary methods such as press molding or vacuum forming for example. When feeding apparatus 1 is molded as a whole, its thickness is normally 0.05–0.5 mm or preferably 0.1–0.3 mm or more preferably 0.15–0.25 mm.

A method of feeding chicks using feeding apparatus 1 is explained below based on FIGS. 4 and 5.

Feed containers 2 are filled with gel feed F in order to feed chicks H.

To install feeding apparatus 1 in chick box 8, feeding apparatus 1 is bent by means of bends 5, and the angles between hanger 4 and first body 11 and between hanger 4 and first body 12 are adjusted to position feed containers 2 below hanger 4.

When feeding apparatus 1 is bent by means of bend 5, insertion hole 44 is formed between connectors 41 provided at both ends of hanger 4.

Protrusion 811 at the top end portion of partition panel 81 of chick box 8 is inserted into thus-formed insertion hole 44, and connectors 41 are laid on top end portion of partition panel 81 to hang hanger 4 on the top end portion of partition panel 81.

Once hanger 4 is hung on the top end portion of partition panel 81, first body 11 and second body 12 are suspended from the top end portion of partition panel 81, and feed containers 2 on first body 11 and second body 12 are suspended from partition panel 81 by means of suspenders 6, aperture direction adjusters 3 and flanges 7. In this way, feed container 2 and the gel feed F contained in feed container 2 are maintained in chick box 8 at the height of the beaks H1 of chicks H when they are standing in chick box 8. The aperture directions of apertures 21 of feed containers 2 are adjusted using aperture direction adjusters 3 so as to be perpendicular or roughly perpendicular to partition panel 81 of chick box 8.

Chicks H consume the gel feed F contained in feed containers 2 with beaks H1 through apertures 21 of feed containers 2. The gel feed F which is maintained in chick box 8 at the height of beaks H1 of chicks H when standing is easy for chicks H to recognize and ingest. Moreover, the fact that the aperture direction of apertures 2 of feed containers 2 is adjusted with aperture direction adjusters 3 to be perpendicular or roughly perpendicular to partition panel 81 of chick box 8 also makes it easier for chicks H to recognize and ingest gel feed F.

Feeding apparatus 1 can be installed on the top end portion of partition panel 81 of chick box 8 even if there is no protrusion 811 at the top end portion of partition panel 81. In this case, connectors 41 are laid on top end portion of partition panel 81 to hang hanger 4 on partition 81 and suspend feed containers 2 from the top end portion of partition panel 81.

Feeding apparatus 1 can also be installed on side panel 82 of chick box 8. When side panel 82 of chick box 8 has a protrusion, this protrusion is inserted into insertion hole 44 and connectors 41 are laid on top end portion of side panel 82 to hang hanger 4 on the top end portion of side panel 82 and suspend feed containers 2 from the top end portion of side panel 82. When side panel 82 of chick box 8 lacks a protrusion (see FIG. 4), connectors 41 are laid on top end portion of side panel 82 to hang hanger 4 on the top end portion of side panel 82 and suspend feed containers 2 from the top end portion of side panel 82.

When installing feeding apparatus 1 to side panel 82 of chick box 8, either first body 11 or second body 12 may be suspended inside chick box 8. Consequently, as shown in FIG. 6, it is also possible to eliminate either first body 11 or second body 12 from feeding apparatus 1 and replace it with sheet 10.

Figure 6:
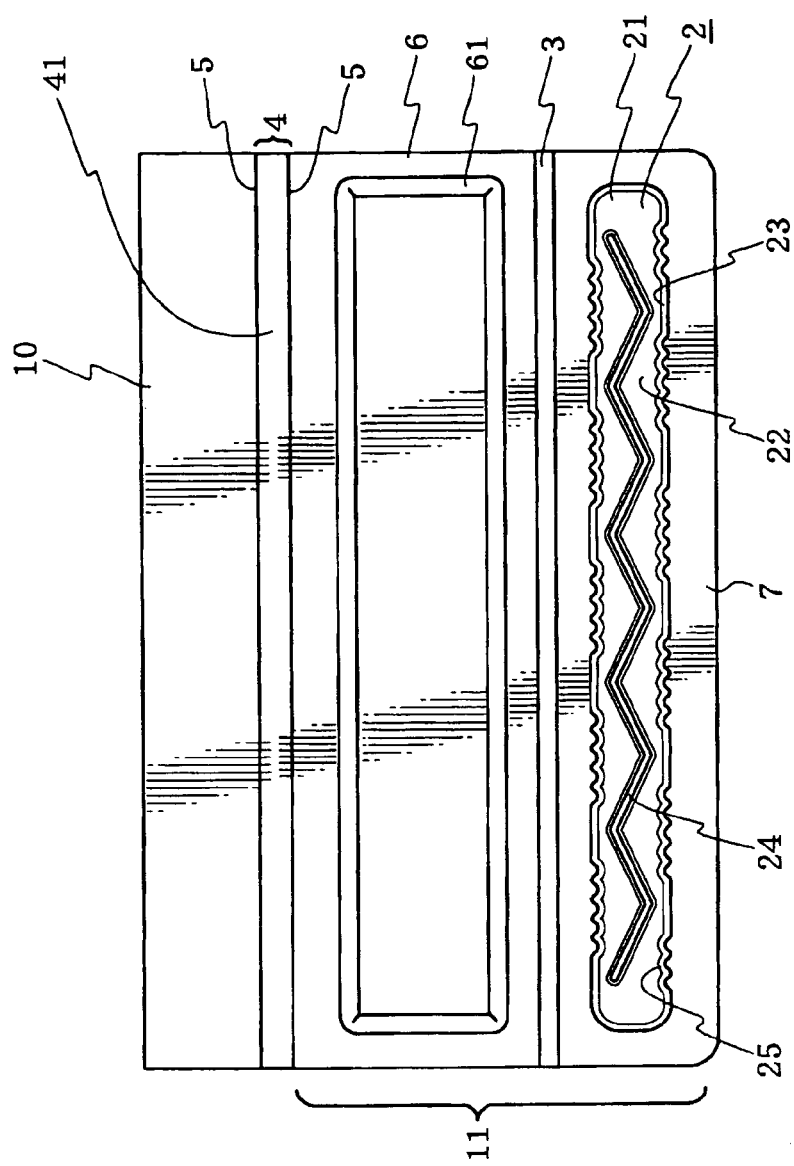
FIG. 6 is a plane view showing another embodiment of the feeding apparatus of the present invention.

When installing feeding apparatus 1 on a side panel 82 (or partition panel 81) which lacks a protrusion at the top end portion, hanger 4 may also be constructed without insertion hole 44, as shown in FIG. 6.

Feeding apparatus 1 may be used for feeding chicks H in chick box 8 when for example chicks H are being reared in chick box 8, or when chicks H are being kept in chick box 8 during shipping or transportation.

The present invention is explained in more detail below using examples, but the present invention is not limited by these examples.

In the examples below, a feeding apparatus 1 having the construction shown in FIGS. 1–3 is used as the feeding apparatus. The feeding apparatus 1 used in the examples below is about 220 mm long (vertical length in FIG. 2), about 235 mm wide (horizontal length in FIG. 2) and about 0.2 mm thick. In the middle it has hanger 4, on both ends of which are rectangular connectors 41, which are about 8 mm long (vertical length in FIG. 2) and 20 mm wide, as well as vertical notches 43, which are about 8 mm long, and horizontal notch 42, which is about 195 mm long. The distance between the centers of feed containers 2 and horizontal notch 42 is about 88 mm. Feed containers 2 have semi-rectangular apertures 21 which are about 20 mm long (vertical length in FIG. 2) and about 215 mm wide (horizontal length in FIG. 2), and the depth of feed containers 2 is about 9 mm.

Moreover, in the following examples, a fiber board box consisting of a bottom about 450 mm long by 600 mm wide surrounded by four vertical side panels and having partition panels to divide the inside of the box into 4 equal-sized compartments was used as the chick box. The partition panels of the chick box were about 165 mm high and about 5 mm thick, and were provided with protrusions at the top end portion.

When feeding apparatus 1 is installed on a partition panel of this chick box, the centers of feed containers 2 are maintained at a height of about 80 mm above the bottom of the chick box, and the feed contained in feed containers 2 is maintained at the height of the chicks' beaks when they are standing.

EXAMPLE 1

(1) Preparation of Gel Probiotic Composition (Agar Solidified Inteclean)

500 ml of variant VL liquid medium premix (containing 5 g tryptone (Oxoid), 2.5 g sodium chloride, 1.2 g Lab-Lemco powder (Oxoid), 2.5 g yeast extract (Difco), 0.2 g cysteine hydrochloride, 1.3 g glucose and 0.3 g agar per 500 ml) was dissolved in pure water, and after addition of 4 g of Ina agar (UM-11) (final agar concentration 0.8% (w/v)), high-pressure steam sterilized for 15 minutes at 121° C. and maintained at 43° C. This was then inoculated with 0.5 ml of aninoculum of commercial Inteclean (trade name, sold by Itochu Feed Mills) as a chicken cecal content culture feed, and cultured anaerobically at 40° C. by the gas pack method. The agar was solidified to prepare a gel probiotic composition (agar solidified Inteclean) containing a CE culture. The inoculum of Inteclean consisted of a 10% (w/v) emulsion of cecal contents removed from roughly 300 day-old laying hens with 10% (v/v) glycerine-added GAM medium (Nissui Pharmaceutical), which was stored frozen before use. The anaerobic culture system of BBL Co. (U.S.A.) was used for the gas pack method. In the gas pack method, the culture is sealed in a special container together with a hydrogen generating bag and a catalyst, and the action of the catalyst causes the generated hydrogen to bind to residual oxygen and form water, exhausting the oxygen and forming an anaerobic environment.

(2) Preparation of Feeding Apparatus and Chick Boxes

The feed containers of each feeding apparatus were filled with 25 ml or 12.5 ml of gel probiotic composition. Eight feeding apparatus with feed containers filled with 25 ml of gel probiotic composition (hereunder "feeding apparatus (a)") and eight feeding apparatus with feed containers filled with 12.5 ml of gel probiotic composition (hereunder "feeding apparatus (b)") were prepared.

Seven chick boxes were prepared in which each of the 4 compartments separated by the partitions contained 25 chicken chicks (aged 0 days), along with 3 boxes in which the compartments contained no chicks.

(3) Test Methods

The following tests were performed using the aforementioned feeding apparatus and chick boxes.

Five each of feeding apparatus (a) and feeding apparatus (b) were suspended from the partition panels of five chick boxes containing chicks. Two feeding apparatus were suspended in each chick box so that each feed container was positioned in a different chamber of the chick box. Two of feeding apparatus (a) were suspended in each of two of the five chick boxes, two of feeding apparatus (b) in each of two other chick boxes, and one each of Feeding apparatus (a) and feeding apparatus (b) in the remaining chick box.

Neither feeding apparatus (a) nor feeding apparatus (b) was installed in the remaining 2 chick boxes which contained chicks.

The five chick boxes with feeding apparatus and the two chick boxes without feeding apparatus were transported from Hatchery A in Niigata Prefecture to Farm B in Iwate Prefecture, and each feeding apparatus was weighed when the feeding apparatus was installed at Hatchery A (3:30 p.m.), two hours after installation (5:30 p.m.) and upon arrival at Farm B (8:00 a.m. of the following day), and the ingestion of gel probiotic composition per chick from each feeding apparatus calculated.

Upon departure from Hatchery A and upon arrival at Farm B, each chick (total 200 chicks) in the chick boxes without feeding apparatus (2 boxes), each chick (total 100 chicks) in the chick box with only feeding apparatus (a) (1 box) and each chick (total 100 chicks) in the chick box with only feeding apparatus (b) (1 box) was weighed, and the weight change per chick calculated for each chick box. The chicks which had been transported in each chick box were also weighed at age 1 week and age 2 weeks to track the growth of the chicks after arrival at Farm B.

In addition, three each of feeding apparatus (a) and feeding apparatus (b) were suspended from the partition panels of three chick boxes that did not contain chicks, and these chick boxes were transported from Hatchery A to Farm B as described above. Spillage of the gel probiotic composition during transport was then inspected, each feeding apparatus was weighed two hours after installation (5:30 p.m.) and upon arrival at Farm B (8:00 the following morning), and the drying (weight loss) of gel probiotic composition calculated.

(4) Test Results

1. Ingestion of Gel Probiotic Composition Per Chick from Each Feeding Apparatus

Ingestion per chick of gel probiotic composition from the 5 feeding apparatus (a) was 0.93 g, 0.60 g, 0.79 g, 0.37 g and 0.76 g two hours after installation (average 0.69 g, s.d. 0.21 g), and 1.05 g, 0.98 g, 0.98 g, 0.94 g and 0.95 g upon arrival at Farm B (average 0.98 g, s.d. 0.04 g).

Ingestion per chick of gel probiotic composition from the 5 feeding apparatus (b) was 0.49 g, 0.51 g, 0.42 g, 0.49 g and 0.37 g two hours after installation (mean 0.46 g, s.d. 0.06 g), and 0.53 g, 0.51 g, 0.51 g, 0.50 g and 0.51 g upon arrival at Farm B (mean 0.51 g, s.d. 0.01 g).

The target ingestion of gel probiotic composition was 0.5 ml per chick.

Mean ingestion per chick of gel probiotic composition from feeding apparatus (a) was 0.69±0.21 g (≈ml) 2 hours after installation, meaning that the target feed ingestion was achieved with some variation, while upon arrival at Farm B it was 0.98±0.04 g (≈ml), meaning about twice the target amount was achieved. Upon arrival at Farm B, virtually all of the gel probiotic composition contained in each feed container of feeding apparatus (a) had been consumed.

Mean ingestion per chick of gel probiotic composition from feeding apparatus (b) was 0.46±0.06 g (≈ml) 2 hours after installation, meaning that 90% of the target feed ingestion was achieved, while upon arrival at Farm B it was 0.51±0.01 g (≈ml), meaning that the target feed ingestion was achieved. Upon arrival at Farm B, all of the gel probiotic composition contained in each feed container of feeding apparatus (b) had been consumed.

These results show that by using feeding apparatus 1 having the construction shown in FIGS. 1–3 as the feeding apparatus, and maintaining the position of the gel probiotic composition at the height of the chicks beaks when they are standing, it is possible to induce the chicks to ingest the necessary quantity of gel probiotic composition in a short period of time.

2. Spillage and Drying of Gel Probiotic Composition During Transport

No spillage or loss of gel probiotic composition from the feed containers was observed in any feeding apparatus.

The drying loss of gel probiotic composition in the three feeding apparatus (a) was 1.9 g, 1.6 g and 1.56 g 2 hours after installation (mean 1.69 g, s.d. 0.19 g), and upon arrival at Farm B it was 10.41 g, 11.39 g and 10.49 g (mean 10.76 g, s.d. 0.54 g).

The drying loss of gel probiotic composition in the three feeding apparatus (b) was 1.6 g, 1.14 g and 1.71 g 2 hours after installation (mean 1.48 g, s.d. 0.30 g), and upon arrival at Farm B it was 9.72 g, 8.82 g and 9.71 g (mean 9.42 g, s.d. 0.52 g).

These results show that by using feeding apparatus 1 having the construction shown in FIGS. 1–3 as the feeding apparatus, it is possible to prevent spillage of gel probiotic composition from the feed containers, and ensure that the gel probiotic composition contained in the feed containers is supplied to the chicks. Moreover, the drying loss of gel probiotic composition was entirely from water evaporation, with no reason to suspect reduction in the bacteria contained in the gel probiotic composition, so it appears that drying of the gel probiotic composition does not detract from the effects of the probiotic composition (the effect of forming the chicks' intestinal flora).

3. Weight Change Per Chick in the Chick Boxes, and 1-Week and 2-Week Weights of Chicks Transported in the Chick Boxes The mean weights per chick of the chicks in the 2 chick boxes without the feeding apparatus were 40.2±2.7 g and 39.7±3.2 g upon leaving Hatchery A, and 37.8±2.3 g and 37.5±2.8 g upon arrival at Farm B, a weight loss of 2.4 g and 2.2 g, respectively. The mean 1-week weights of the chicks transported in these boxes were 79.7±5.8 g and 79.9±4.9 g, while their mean 2-week weights were 136.5±10.9 g and 137.0±9.2 g.

The mean weight per chick of the chicks in the box equipped with feeding apparatus (a) only was 39.3±2.7 g upon leaving Hatchery A and 37.6±2.3 g upon arrival at Farm B, a weight loss of 1.7 g. The mean 1-week weight of the chicks that had been transported in this box was 78.3±5.0 g, while their mean 2-week weight was 135.2±9.4 g.

The mean weight per chick of the chicks in the box equipped with feeding apparatus (b) only was 40.1±2.6 g upon leaving Hatchery A and 38.1±2.2 g upon arrival at Farm B, a weight loss of 1.9 g. The mean 1-week weight of the chicks that had been transported in this box was 80.3±5.9 g, while their mean 2-week weight was 137.4±11.5 g.

The weight loss per chick in the boxes without feeding apparatus was 2.2 g to 2.4 g, while the weight loss per chick in the boxes equipped with feeding apparatus (a) or (b) was 1.7 g to 1.9 g, indicating that consumption of gel probiotic composition controlled the chicks' weight loss during transport. No obvious difference was seen in mean 1-week and 2-week weights of chicks that had been transported in the boxes depending on whether the boxes were equipped with the feeding apparatus.

EXAMPLE 2

(1) Preparation of Colored and Uncolored Gel Probiotic Composition

As in Example 1, 500 ml of variant VL liquid medium premix was dissolved in pure water, and after addition of 4 g of Ina agar (UM-11) (final agar concentration 0.8% (w/v)), high-pressure steam sterilized for 15 minutes at 121° C. and maintained at 43° C. This was then inoculated with 0.5 ml of Inteclean inoculum, and cultured anaerobically at 40° C. by the gas pack method to obtain a CE culture containing agar.

49.5 ml of this CE culture was placed in a sterile bin, and 0.5 ml of a 10% (w/v) Red No. 1 solution or a 10% (w/v) Blue No. 4 solution added (Red No. 1 final concentration 0.1% (w/v), Blue No. 4 final concentration 0.1% (w/v)).

25.0 ml amounts of a sample of the CE culture to which neither Red No. 1 nor Blue No. 4 had been added (hereunder "uncolored sample"), a sample of the CE culture to which Red No. 1 had been added (hereunder "red sample") and a sample of the CE culture to which Blue No. 4 had been added (hereunder "blue sample") were poured into petri dishes and feed containers of the feeding apparatus, solidified, and stored frozen in sealed containers until use.

(2) Ingestion Test of Colored and Uncolored Gel Probiotic Composition

Petri dishes containing the uncolored sample, the red sample and the blue sample were placed on the floor of chick boxes, or feeding apparatus filled with the uncolored sample, the red sample and the blue sample were suspended from the partition panels of chick boxes, and used to feed freely same-day (0 day old) and next-day (1 day old) chicks. Chicken chicks were used.

Of the four compartments of a chick box separated by partition panels, 10 chicks each were placed in two compartments, and petri dishes containing uncolored feed placed on the floor to supply the chicks with uncolored feed ("Test Group 1"). Twenty-five chicks were placed in each of the two remaining compartments, and a feeding apparatus filled with uncolored feed suspended from the partition panel separating the two compartments to supply the chicks with uncolored feed ("Test Group 2").

Of the four compartments of another chick box separated by partition panels, 25 chicks each were placed in two compartments, and a feeding apparatus filled with red feed suspended from the partition panel separating the two compartments to supply the chicks with red feed ("Test Group 3"). 25 chicks each were placed in the remaining two compartments, and a feeding apparatus filled with blue feed suspended from the partition panel separating the two compartments to supply the chicks with blue feed ("Test Group 4").

Each sample was weighed before being given to the chicks, and also weighed at fixed intervals thereafter, and feed ingestion per chick was calculated.

The feed ingestion of the same-day chicks is shown in Table 1 and that of the next-day chicks in Table 2.

TABLE 1

| | Elapsed time (hours) | | | | | | | |
|---|---|---|---|---|---|---|---|---|
| Test Group | 0 | 0.5 | 1 | 2 | 3 | 4 | 6 | 8 |
| 1 | 0 g | 0.4 g | 0.4 g | 0.6 g | 1.7 g | 2.0 g | 2.0 g | 2.0 g |
| 2 | 0 g | 0.2 g | 0.4 g | 0.6 g | 1.2 g | 1.6 g | 1.9 g | 1.9 g |
| 3 | 0 g | 0 g | 0.1 g | 0.2 g | 0.5 g | 1.1 g | 1.4 g | 1.7 g |
| 4 | 0 g | 0.1 g | 0.2 g | 0.4 g | 1.3 g | 1.9 g | 2.0 g | 2.0 g |

TABLE 2

| | Elapsed time (hours) | | | | | |
|---|---|---|---|---|---|---|
| Test Group | 0 | 0.5 | 1 | 2 | 4 | 8 |
| 1 | 0 g | 0.5 g | 0.5 g | 1.1 g | 1.3 g | 1.7 g |
| 2 | 0 g | 1.2 g | 1.8 g | 2.0 g | 2.0 g | 2.0 g |
| 3 | 0 g | 1.1 g | 1.3 g | 2.0 g | 2.0 g | 2.0 g |
| 4 | 0 g | 2.0 g | 2.0 g | 2.0 g | 2.0 g | 2.0 g |

When chicks were fed by the conventional method by placing uncolored feed on the floor (Test Group 1), the same-day chicks fed well (see Table 1), but the next-day chicks did not (see Table 2). This is thought to be because same-day chicks are not yet steady on their feet and spend a lot of time sitting, making it easier for them to recognize and ingest feed placed on the floor, while next-day chicks spend more time standing, making it easier for them to recognize and ingest feed placed at the height of their beaks.

Even though it was easier for the same-day chicks to recognize and ingest feed placed on the floor, however, the blue feed contained in the feeding apparatus (Test Group 4) was ingested in roughly the same amount (see Table 1) as the uncolored feed placed on the floor (Test Group 1). By contrast, the uncolored feed (Test Group 2) and red feed (Test Group 3) contained in the feeding apparatus was ingested in lower amounts than the uncolored feed (Test Group 1) placed on the floor (see Table 1).

As mentioned above, it was easier for the next-day chicks to recognize and ingest feed placed at the height of their beaks, but of the uncolored, red and blue feeds contained in the feeding apparatus (Test Groups 2, 3 and 4), more of the blue feed was ingested (see Table 2).

These results showed that chicks prefer feed that is colored blue over feed that is uncolored or colored red. Namely, it was shown that by adding blue color to gel probiotic composition contained in the feed containers of a feeding apparatus, it is possible to induce chicks to ingest the necessary amount of gel probiotic composition in a short period of time.

EXAMPLE 3

(1) Preparation of Uncolored and Colored Gel Probiotic Composition

A CE culture containing agar was obtained in the same way as in Example 2, and 49.5 ml of this CE culture was placed in a sterile bin and 0.5 ml of a 10% (w/v) Blue No. 4 solution added (final Blue No. 4 concentration 0.1% (w/v)) to obtained blue feed.

48.9 ml of the CE culture was also placed in a separate sterile bin, and 0.1 ml of a 10% (w/v) Blue No. 4 solution and 1.0 ml of an 0.5% (w/v) phenol red solution added, followed by 0.5 ml of 1N hydrochloric acid to obtain green feed.

25.0 ml each of uncolored CE culture (hereunder "uncolored feed") the blue feed and the green feed were poured into petri dishes and the feed containers of feeding apparatus, solidified, and stored frozen in sealed containers until use.

(2) Ingestion Test of Uncolored and Colored Gel Probiotic Composition

Petri dishes containing uncolored, blue or green feed were placed on the floor of chick boxes, or feeding apparatus containing uncolored, blue or green feed were suspended from the partition panels of chick boxes, and same-day (0 day old) chicks given free access to the feed. Chicken chicks were used.

10 chicks each were placed in two of four compartments of a chick box separated by partition panels, and petri dishes containing uncolored feed placed on the floor to supply uncolored feed to the chicks ("Test Group 1"). 25 chicks were placed in each of the remaining 2 compartments, and a feeding apparatus containing uncolored feed was suspended from the partition panel separating the two compartments to supply uncolored feed to the chicks ("Test Group 2").

25 chicks each were placed in two of four compartments of another chick box separated by partition panels, and a feeding apparatus containing blue feed was suspended from the partition panel separating the two compartments to supply blue feed to the chicks ("Test Group 3"). 25 chicks each were also placed in the remaining two compartments, and a feeding apparatus containing green feed was suspended from the partition panel separating the two compartments to supply green feed to the chicks ("Test Group 4").

Each feed was weighed before being given to the chicks, and also at fixed intervals afterwards, and the ingestion per chick was calculated from the amount of feed consumed. The feed ingestion of the same-day chicks is shown in Table 3 below.

TABLE 3

| Test Group | Elapsed Time (hours) | | | | | | | |
|---|---|---|---|---|---|---|---|---|
| | 0 | 0.5 | 1 | 2 | 3 | 4 | 5 | 7 |
| 1 | 0 g | 0.1 g | 0.1 g | 0.3 g | 0.6 g | 1.1 g | 1.9 g | 2.5 g |
| 2 | 0 g | 0 g | 0.1 g | 0.2 g | 0.5 g | 0.8 g | 1.0 g | 1.2 g |
| 3 | 0 g | 0 g | 0.1 g | 0.3 g | 0.7 g | 1.0 g | 1.2 g | 1.2 g |
| 4 | 0 g | 0 g | 0 g | 0.1 g | 0.2 g | 0.3 g | 0.6 g | 0.8 g |

The same-day chicks ingested roughly the same amount of blue feed from the feeding apparatus (Test Group 3) as they did uncolored feed from the floor (Test Group 1). By contrast, they ingested less of the uncolored feed (Test Group 2) and green feed (Test Group 4) from the feeding apparatus than they did uncolored feed from the floor (Test Group 1) and blue feed from the feeding apparatus (Test Group 3).

These results show that chicks prefer blue colored feed to green colored feed. In other words, blue coloring of the gel feed contained in the feed container of the feeding apparatus is more effective at inducing chicks to consume the necessary amount of gel probiotic composition in a short period of time than is green coloring.

EXAMPLE 4

(1) Preparation of Colored Gel Probiotic Compositions with Different Pigment Concentrations CE culture containing agar was obtained in the same way as in Example 2, 4 sterile bins were filled with 50 ml each of this CE culture, and 0.5 ml, 0.2 ml 0.1 ml and 0.05 ml of a 10% (w/v) Blue No. 4 solution added to final concentrations of 0.1% (w/v), 0.04% (w/v), 0.03% and 0.02% (w/v) of Blue No. 4.

25.0 ml of each sample was poured into a feeding apparatus, solidified, and stored frozen in a sealed container until use.

(2) Ingestion Test of Colored Gel Probiotic Compositions with Different Pigment Concentrations The same-day chicks (0 days old) were given free access to the samples contained in the feeding apparatus. Chicken chicks were used.

25 chicks each were placed in each of four compartments of a chick box divided by partition panels, and feeding apparatuses filled with the samples were suspended from the partition panels to supply feed to the chicks.

Each sample was weighed before being given to the chicks and at fixed intervals afterwards, and the ingestion per chick was calculated from the amount of feed consumed.

The ingestion of the same-day chicks is shown in Table 4 below.

TABLE 4

| Concentration | Elapsed Time (hours) | | | | | | |
|---|---|---|---|---|---|---|---|
| | 0 | 0.5 | 1 | 2 | 3.5 | 4.5 | 5.5 |
| 0.1% | 0 g | 0 g | 0 g | 0.1 g | 0.6 g | 1.0 g | 1.0 g |
| 0.04% | 0 g | 0 g | 0.1 g | 0.3 g | 0.6 g | 0.9 g | 1.0 g |
| 0.03% | 0 g | 0 g | 0.1 g | 0.2 g | 0.7 g | 1.0 g | 1.0 g |
| 0.02% | 0 g | 0 g | 0 g | 0.1 g | 0.4 g | 0.9 g | 1.0 g |

Feed ingestion by the chicks did not vary greatly depending on the concentration of Blue No. 4, but was slightly lower at 0.02%, which is close to green, and slightly higher at 0.03%–0.04%.

The results indicate that chicks prefer blue colored feed independent of the concentration of blue pigment. That is, by coloring blue the gel probiotic composition contained in the feed container of a feeding apparatus, it is possible to induce chicks to consume the necessary amount of gel probiotic composition in a short period of time regardless of the concentration of blue pigment in the gel probiotic composition.

INDUSTRIAL APPLICABILITY

With the feeding apparatus and feeding method of the present invention it is possible to induce chicks to consume feed efficiently by maintaining or positioning the feed at the height of the chicks' beaks when they are standing.

The invention claimed is:

1. A feeding apparatus for birds, the apparatus comprising:
   a box for containing the birds;
   a partition disposed in the box,
   at least one flat member hanging on the partition;
   a container for feed provided in one portion of the member; and
   a groove formed in the member to permit the member to be folded along the groove to adjust the location of the one portion, and therefore the container, so that the feed can be maintained at the height of the birds' beaks when they are standing.

2. The feeding apparatus of claim 1 wherein the groove extends across the at least one member and the container is located between the groove and an end of the at least one member.

3. The feeding apparatus of claim 1 wherein the at least one member is also folded about a transverse center fold to form two member portions, and wherein the center fold extends over the top of the partition, and the member portions extend to the respective sides of the partition.

4. The feeding apparatus of claim 3 further comprising a protrusion extending from me upper portion of the partition and through an opening in the center fold.

5. The feeding apparatus of claim 3 wherein one container is provided in one member portion, and further comprising another container provided in the other member portion.

6. The feeding apparatus of claim 5 wherein another groove is formed in the other member portion, extends across the other member portion, and wherein the other container is located between the latter groove and an end of the other member portion.

7. The feeding apparatus of claim 1 wherein the folding of the one portion of the at least one member along the groove relative to another portion of the at least one member adjusts the relative angular position between the portions.

* * * * *

UNITED STATES PATENT AND TRADEMARK OFFICE
CERTIFICATE OF CORRECTION

PATENT NO. : 7,004,110 B2
DATED : February 28, 2006
INVENTOR(S) : Morikoshi et al.

It is certified that error appears in the above-identified patent and that said Letters Patent is hereby corrected as shown below:

<u>Column 19,</u>
Line 28, insert -- at least one -- after "formed in the".
Line 28, insert -- at least one -- after "permit the".

Signed and Sealed this

Thirteenth Day of June, 2006

JON W. DUDAS
*Director of the United States Patent and Trademark Office*